March 4, 1947.  A. U. McGILL  2,416,836
MOLD-BLANKETING MATERIAL
Filed Sept. 16, 1942

Inventor
Alryc U. McGill,
By
Attorney

Patented Mar. 4, 1947

2,416,836

UNITED STATES PATENT OFFICE 2,416,836

MOLD-BLANKETING MATERIAL

Alryc U. McGill, Stuttgart, Ark.

Application September 16, 1942, Serial No. 458,563

1 Claim. (Cl. 22—188)

This invention relates to mold-blanketing material of the kind used to cover castings that have been poured in open topped molds, particularly ingots, for the purpose of insulating the metal against too rapid escape of heat and to protect the metal from the oxidizing influence of the atmosphere.

The principal object of the invention is to provide such a material of moderate cost and having ideal qualities for its intended use, which qualities in brief are: a physical mixture containing particles and air spaces in such relation as will permit gases to escape with sufficient freedom to avoid interference with their evolution or blowing off of the insulating material, a structure that will prevent free access of air to the surface of the metal, a physical particle structure that will maintain the particles in position against settling or packing, a material that is an efficient heat insulation, and a chemical constitution that will burn readily to produce a slightly reducing condition at the surface of the metal and that will not contaminate the metal either during burning or as an ash.

I have discovered that rice hulls, that is to say the husk portions enclosing the rice kernels or grains, which husk is removed by the usual husking or shelling operation, constitute an ideal material chemically for blanketing castings, since they are of substantially pure cellulose and, being thin, they burn readily to a white ash that has no chemical components that will contaminate metal in molten state.

The accompanying drawings disclose substantially the various shapes of portions of the rice hulls from which my mold-blanketing material is formed, and referring more particularly thereto, in detail, Figure 1 is an enlarged plan view of the inside of one-half part of a rice hull after the kernel has been removed by a husking machine.

Figure 1:
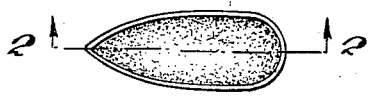
Figure 3:
Figure 3 is a plan view of the longitudinal one-half of the half portion of a rice hull as shown in Figure 1.
Figure 2:
Figure 2 is a section on line 2—2 of Figure 1.
Figure 4:
Figure 4 is a plan view of the portion of the rice hull of Figure 3 after the same has been transversely divided into halves.
Figure 5:
Figure 5 is a plan view of that portion of the rice hull of Figure 3 after the same has substantially been transversely divided into thirds.
Figure 6:
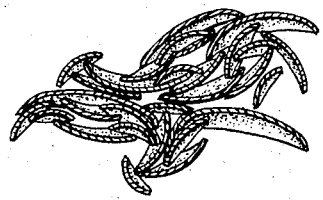
Figure 6 is a sectional view of the mold-blanketing material composed of the various shaped parts of the rice hulls of Figures 2, 3, 4 and 5 after the same have been intermingled or mixed together.

As received from the husker or sheller, rice hulls are substantially in the form of longitudinal halves of the complete husk, being approximately five-sixteenths of an inch in length and an eighth of an inch in width, boat-shaped, and presenting an outer surface that is curved longitudinally and transversely, and pointed at one end but quite rounded at the other. I have learned that these hulls of substantially one-half size, as delivered from the husker or sheller, weighing only 7 or 8 pounds to the cubic foot, are not physically suited for use as a mold-blanketing material, as a body of them is of too low a density, due to the size thereof, their shape and the consequent large air spaces that are present among them, both enclosed within them and between them. On the other hand, a body of uniformly ground rice hulls has a tendency to pack to a density that is too high for mold blanketing purposes.

I have discovered that full advantage may be taken of the ideal chemical characteristics of rice hulls, and a body that has ideal physical characteristics for mold blanketing may be produced by forming a mixture of the rice hulls of substantially one-half size that have been longitudinally divided, i. e., shredded, and rice hulls that have been transversely divided. These portions of the hulls are shredded to a weight of approximately 14 pounds to the cubic foot, by passing a stream of such removed portions of the hulls between revolving shafts, dual pointed, and a curved iron screen, indented with holes large enough, approximately $\tfrac{7}{16}''$, which, in practice, produces a shredded product and produces particles that are long, narrow and longitudinally curved, but they do not have the boat shape that is characteristic of the complete substantially one-half sized hulls. A body of such particles forms a stable structure, their length, curve and pointed ends interlocking one with the other to prevent shifting about of the particles within the mass, they also interengage with particles of the transversely divided portions of the hulls to prevent shifting of such other particles, thereby preventing packing of the mass or settling out of the transversely divided hull particles.

The particles of the transversely divided portions of the hulls are meniscoid and of irregular outline, and they act as a filler among the particles of the shredded portions of the hulls, producing a mixture wherein air spaces and particles are so distributed as to produce a highly efficient insulating body, and one that is not subject to packing.

Specifically, I prefer a mixture comprising three components, the first being all of the particles resulting from the division of rice hulls into particles approximately one-half to three-quarters of the full size of the original hulls, divided transversely, being produced to weigh approximately 19 pounds to the cubic foot, by passing a stream of hulls between dual pointed, rotating shafts and an iron screen with $\frac{1}{2}''$ sized perforations to retain the hulls over the screen for transverse breakage, the largest possible sizes passing through, being one-half to three-quarter. The second being longitudinally shredded portions of the removed parts of the hulls, and the third being the removed portions of the hulls transversely divided into thirds, being produced to weigh approximately 24 pounds to the cubic foot, by passing a stream of said portions of the hulls between dual pointed, rotating shafts and an iron screen with $\frac{1}{4}''$ holes. By "hulls" in the foregoing is meant the starting material consisting of substantially the halves of the husks delivered by the husking or shelling machine. The three components are mixed in equal bulk or cubicle parts, each part forming approximately one-third of the whole bulk, for practical blending with any given measure or mixing bin, which proportions will give to the mixture of from 17 to 21 pounds per cubic foot, and which proportions have been determined to give a body that is ideally suited for mold-blanketing purposes.

In actual practice it has been proved that the use of a layer four to six inches thick, of the mixture set forth spread over the surface of the metal in a freshly teemed ingot mold, or in a hot top applied to such a mold, will produce an effective insulating layer that will maintain the metal in molten condition for a time sufficient to permit gases to escape, that it permits the gases to rise from the metal, protects the metal from oxidation, and burns readily to a fluffy white ash that remains free of the metal and does not in any way contaminate it.

I claim as my invention:

A mold blanketing material consisting of reduced, intermingled and interconnected portions of untreated rice hulls so as to produce a body which in its aggregate form has a weight of substantially seventeen to twenty-one pounds to the cubic foot and in which all of said portions are of a form to prevent substantial relative shifting with respect to each other, one-third portion of said reduced hulls being shredded to produce particles of one-fourth size that are long, narrow and longitudinally curved, and the remaining two-thirds portions of the reduced hulls being transversely divided and of a size not less than one-sixth of said untreated rice hulls.

ALRYC U. McGILL.

REFERENCES CITED

The following references are of record in the file of this patent:

UNITED STATES PATENTS

| Number | Name | Date |
|---|---|---|
| 1,696,986 | Trembour | Jan. 1, 1929 |
| 2,165,945 | Seaver | July 11, 1939 |
| 111,984 | Smith | Feb. 21, 1871 |
| 1,281,097 | Toles | Oct. 8, 1918 |
| 991,271 | Cabot | May 2, 1911 |
| 1,377,125 | Gurjan | May 3, 1921 |